(12) United States Patent
Lahr (10) Patent No.: US 9,754,358 B1
(45) Date of Patent: Sep. 5, 2017

(54) IMAGE CONTENT ENHANCEMENT GENERATING AND PRESENTING SYSTEM, DEVICE, AND METHOD

(71) Applicant: Weston J. Lahr, Sherwood, OR (US)

(72) Inventor: Weston J. Lahr, Sherwood, OR (US)

(73) Assignee: Rockwell Collins, Inc., Cedar Rapids, IA (US)

(*) Notice: Subject to any disclaimer, the term of this patent is extended or adjusted under 35 U.S.C. 154(b) by 0 days.

(21) Appl. No.: 14/859,932

(22) Filed: Sep. 21, 2015

(51) Int. Cl.
  *G06T 5/00* (2006.01)
  *G06T 5/40* (2006.01)

(52) U.S. Cl.
  CPC .......... *G06T 5/002* (2013.01); *G06T 5/40* (2013.01); *G06T 2207/20192* (2013.01)

(58) Field of Classification Search
  CPC .. G06T 5/002; G06T 5/40; G06T 2207/20192
  See application file for complete search history.

(56) References Cited

U.S. PATENT DOCUMENTS

| | | | | |
|---|---|---|---|---|
| 5,220,624 A * | 6/1993 | Sakamoto | ............... | G06T 5/004 348/625 |
| 5,960,123 A * | 9/1999 | Ito | ............... | G06K 9/40 382/128 |
| 6,252,995 B1 * | 6/2001 | Takamori | ............... | G06T 5/004 382/254 |
| 6,259,823 B1 * | 7/2001 | Lee | ............... | G06T 5/20 375/E7.135 |
| 2005/0254722 A1 * | 11/2005 | Fattal | ............... | G06T 5/009 382/274 |
| 2007/0098290 A1 * | 5/2007 | Wells | ............... | G06T 11/00 382/254 |
| 2008/0101678 A1 * | 5/2008 | Suliga | ............... | G06K 9/4671 382/132 |
| 2008/0205785 A1 * | 8/2008 | Geiger | ............... | G06T 5/20 382/260 |
| 2009/0169102 A1 * | 7/2009 | Zhang | ............... | G06T 3/4061 382/167 |
| 2012/0082397 A1 * | 4/2012 | Zhai | ............... | G06T 5/50 382/274 |
| 2013/0223717 A1 * | 8/2013 | Reboni | ............... | G06T 7/0012 382/131 |

(Continued)

OTHER PUBLICATIONS

Fourier transforms of images (downloaded Jun. 12, 2017).*
The Laplacian pyramid (downloaded Oct. 7, 2016).*

*Primary Examiner* — Yubin Hung
(74) *Attorney, Agent, or Firm* — Daniel M. Barbieri; Donna P. Suchy; Angel N. Gerdzhikov (57) ABSTRACT

A system, device, and method for generating and presenting enhanced image content are disclosed. The enhanced image content presenting system may include a display system receiving enhanced spatial image pixel (SIP) data from an image processor (IP). The IP may be configured to acquire one or more first frequency image pixel (FIP) data, create one or more second FIP data as a function of the at least one first FIP data; determine one or more first enhancement metrics as a function of the one or more second FIP data; and enhance each one of the FIP data as a function of one first enhancement metric or a combination of the first enhancement metrics. In some embodiments, each FIP data may have been formed as a layer of a Laplacian pyramid that results from a deconstruction of pre-enhanced SIP data.

14 Claims, 9 Drawing Sheets

(56) References Cited

U.S. PATENT DOCUMENTS

| | | | |
|---|---|---|---|
| 2014/0064632 A1* | 3/2014 | Manabe | G06T 5/00 382/254 |
| 2015/0221087 A1* | 8/2015 | Houjou | G06T 5/50 382/128 |
| 2015/0269735 A1* | 9/2015 | Tateno | G06T 7/0046 382/153 |

* cited by examiner

IMAGE CONTENT ENHANCEMENT GENERATING AND PRESENTING SYSTEM, DEVICE, AND METHOD

BACKGROUND

Aircraft employ enhanced vision systems (singularly, EVS) to provide the pilot a real-time view of a scene outside an aircraft. Unlike synthetic vision systems which provide the pilot with colorful synthetic images based upon the aircraft's position measured by a navigation system for finding latitude, longitude, and altitude and a database of Earth's elevations from which elevations may be retrieved knowing the aircraft's position, the EVS employs one or more sensors (e.g., a camera to detect lighted objects visible to the human eye) from which images may be formed. As such, a navigation system and a database are not needed when an EVS is employed.

Generally, EVS sensors acquire wavelengths in the electromagnetic spectrum from which spatial images comprised of a collection of pixels may be formed and presented to the viewer. While the spatial pixel images being presented to the viewer as changes to pixel intensities of colors or shades is useful by providing the viewer with an image of an actual scene visually perceptible to a human eye, spatial pixel images may be converted into frequency pixel images comprised of frequency amplitudes from which useful information imperceptible to the human eye may be gleaned by measuring changes in frequency pixel amplitudes with the use of data image processing techniques.

The process of conversion in image processing could employ pyramids that produce multiple layers, where the size of each subsequent layer is half of the size (or resolution) of the layer from which from which the subsequent layer is formed. If each subsequent layer is stacked upon the preceding layer, the general shape of a pyramid forms. One possible conversion technique which deconstructs a spatial image into a frequency image is known as the Laplacian pyramid.

Figure 1A:
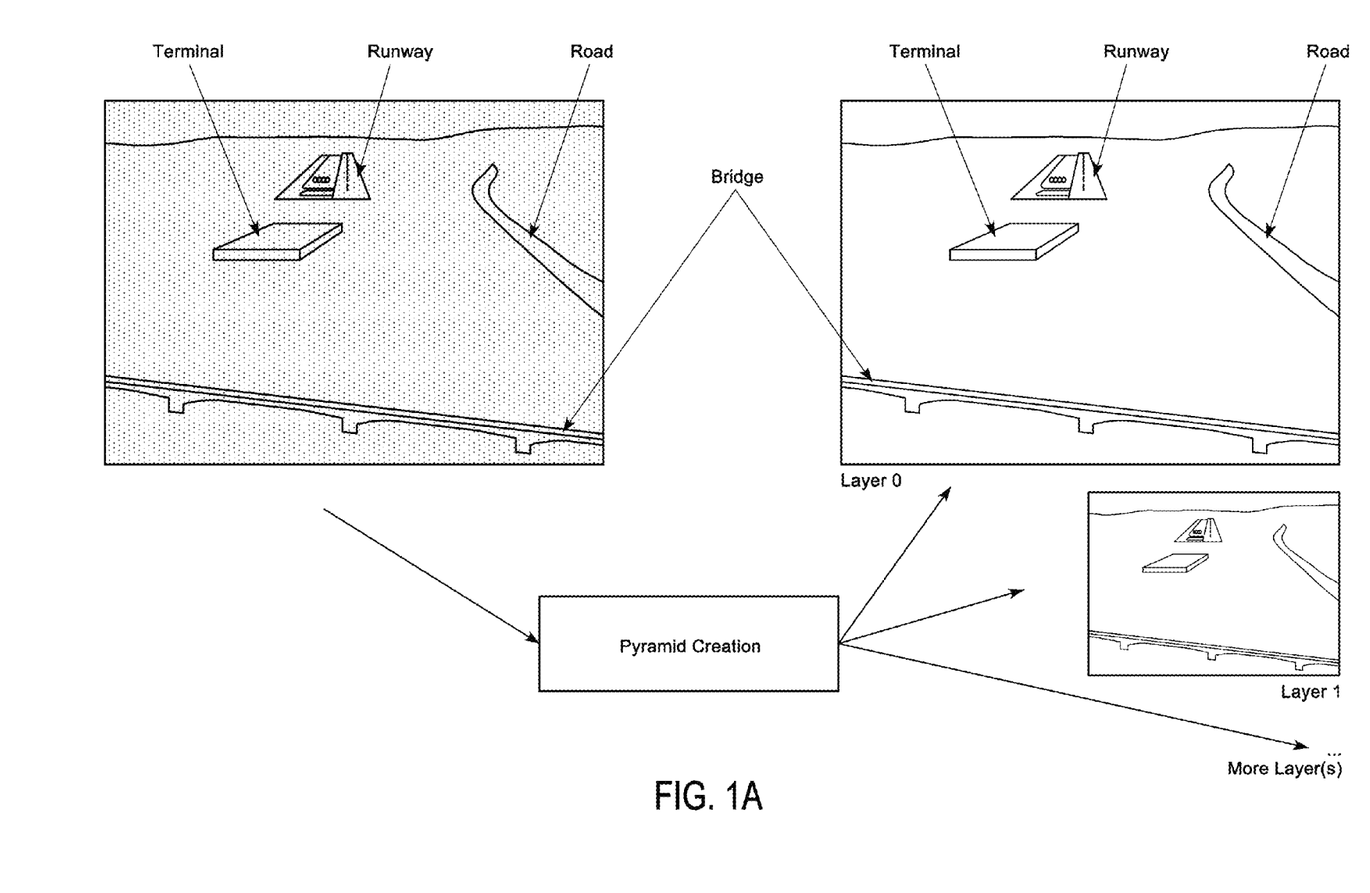
FIG. 1A depicts exemplary images represented by spatial image pixel (SIP) data and frequency image pixel (FIP) data.
Figure 1B:
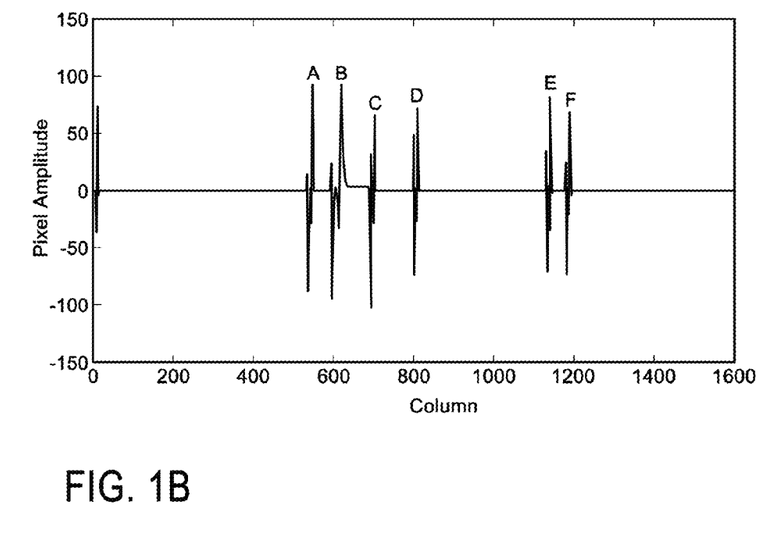
FIG. 1B depicts the SIP image of FIG. 1A and a corresponding graph of a plot of frequency amplitudes of one row.

Referring now to FIG. 1A, an exemplar spatial pixel image containing a runway, terminal, road, and bridge built upon flat terrain has been deconstructed into a frequency pixel image comprised of a plurality of layers of a Laplacian pyramid (the beginning of an upside-down pyramid comprised of two layers is formed). For each layer, one or more edge detection techniques may be employed to identify points in a digital layer at which the image brightness changes sharply, indicative of discontinuities referred to as "edges" of features. The changes in brightness of Laplacian layer pixels may be measured as pixel amplitude. Referring now to FIG. 1B, one row of the top Laplacian layer (referred to as layer 0 of FIG. 1A) is highlighted along with a graph containing a plot of frequency amplitudes versus pixel columns from which edges of features of the runway (identified with the letters A, B, C, and D) and highway (identified with the letters E and F) for one row may be identified. As observed, few features found on flat terrain may produce easily definable edges.

While a scene comprised of flat terrain and few features may produce easily definable edges, a scene which contains many objects, uneven or jagged terrain may produce numerous edges measured by numerous pixel amplitudes referred to as "noise." With the presence of numerous edges, it may be difficult to separate or distinguish between content comprised of "features" and content comprised of "noise." Without an employment of enhancement methods to manipulate the frequency pixel image, a reconstruction of the Laplacian layers may result with no changes being made, resulting in the same spatial image.

SUMMARY

Embodiments of the inventive concepts disclosed herein are directed to a system, device, and method for generating and presenting enhanced image content. The inventive concepts disclosed herein may automatically adjust the amount of enhancement, thereby reducing the pilot's workload while increasing situational awareness.

In one aspect, embodiments of the inventive concepts disclosed herein are directed to a system for presenting enhanced image content. The system may include a source of sensor image data, an image processor (IP), and a display system.

In a further aspect, embodiments of the inventive concepts disclosed herein are directed to a device for generating enhanced image content. The device may include the IP and may be configured to perform the method as disclosed in the following paragraph.

In a further aspect, embodiments of the inventive concepts disclosed herein are directed to a method for generating enhanced image content. When properly configured, the IP may acquire one or more first frequency image pixel (FIP) data being comprised of a plurality of first frequency pixel amplitudes, create one or more second FIP data as a function of the at least one first FIP data, determine one or more first enhancement metrics as a function of the one or more second FIP data, and enhance each one of the FIP data as a function of one first enhancement metric or a combination of the first enhancement metrics. In some embodiments, the plurality of first frequency pixel amplitudes may be layers of Laplacian pyramid created from spatial image pixel data.

DETAILED DESCRIPTION

In the following description, several specific details are presented to provide a thorough understanding of embodiments of the inventive concepts disclosed herein. One skilled in the relevant art will recognize, however, that the inventive concepts disclosed herein can be practiced without one or more of the specific details or in combination with other components. In other instances, well-known implementations or operations are not shown or described in detail to avoid obscuring aspects of various embodiments of the inventive concepts disclosed herein.

Figure 2A:
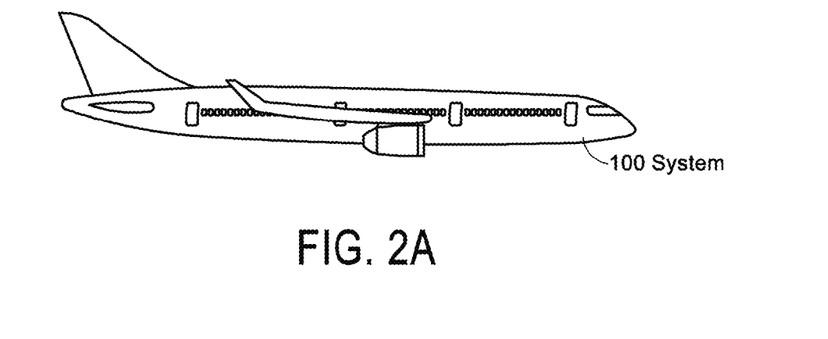
FIG. 2A depicts an aircraft configured with an image content enhancing (ICE) system according to the inventive concepts disclosed herein.
Figure 2B:
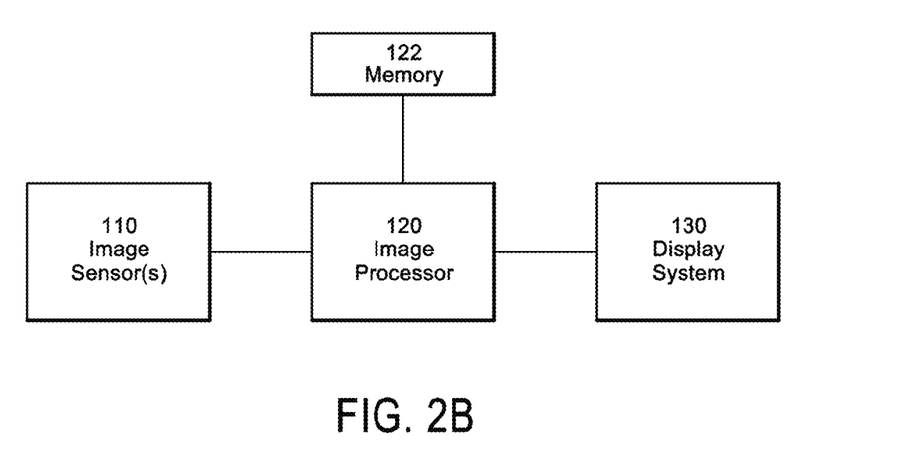
FIG. 2B depicts a functional block diagram of the ICE system of FIG. 2A.

FIG. 2A depicts an aircraft configured with an image content enhancing (ICE) system 100 of an enhanced vision system (EVS) suitable for implementation of the techniques described herein. FIG. 2B depicts a functional block diagram of the ICE system 100 suitable for implementation of the techniques described herein. The functional blocks of the ICE system 100 include image sensor(s) 110, an image processor (IP) 120, and a display system 130.

The image sensor(s) 110 could include one or more EVS sensors configured to acquire a real-world image of a scene outside an aircraft. EVS sensors could include, but not be limited to, infrared (IR) sensor(s) and camera sensor(s). IR sensors may be designed to work within the IR electromagnetic spectrum bandwidth. Some may be used to detect lighted objects emanating from the scene and others to detect thermal differences. The camera sensor may be designed to work within the visible electromagnetic spectrum bandwidth; the camera sensor, along with other sensors, may be used to detect visible light detectable by the human eye. It should be noted that data such as image data and enhanced image data could include any analog or digital signal, either discrete or continuous, which could contain information or be indicative of information. Furthermore, it should be noted that, although the inventive concepts herein are drawn towards the field of aviation, they are not limited to such field but may be applied in any field in which an automatic determination of image content enhancement could be applied such as automotive and medical imaging.

The IP 120 could include any electronic data processing unit which executes software or computer instruction code that could be stored, permanently or temporarily, in a digital memory storage device or a non-transitory computer-readable media (generally, memory 122) including, but not limited to, random access memory (RAM), read-only memory (ROM), compact disc (CD), hard disk drive, diskette, solid-state memory, Personal Computer Memory Card International Association card (PCMCIA card), secure digital cards, and compact flash cards. The IP 120 may be driven by the execution of software or computer instruction code containing algorithms developed for the specific functions embodied herein. The IP 120 may be an application-specific integrated circuit (ASIC) customized for the embodiments disclosed herein. Common examples of electronic data processing units are microprocessors, Digital Signal Processors (DSPs), Programmable Logic Devices (PLDs), Programmable Gate Arrays (PGAs), and signal generators; however, for the embodiments herein, the term "processor" is not limited to such processing units and its meaning is not intended to be construed narrowly. For instance, the IP 120 could also include more than one electronic data processing unit.

In some embodiments, the terms "programmed" and "configured" are synonymous. The IP 120 may be electronically coupled to systems and/or sources to facilitate the receipt of input data. In some embodiments, operatively coupled may be considered as interchangeable with electronically coupled. It is not necessary that a direct connection be made; instead, such receipt of input data and the providing of output data could be provided through a bus, through a wireless network, or as a signal received and/or transmitted by the IP 120 via a physical or a virtual computer port. The IP 120 may be programmed or configured to execute the method discussed in detail below. The IP 120 may be programmed or configured to provide output data to various systems and/or units including, but not limited to, a display system.

The display system 130 may include one or more display units configured to present an EVS image, either in whole or in part, to the pilot. The display unit could be part of an Electronic Flight Information System (EFIS) and could be comprised of, but is not limited to, a Primary Flight Display (PFD), Navigation Display (ND), Head-Up Display (HUD), Head-Down Display (HDD), Multi-Purpose Control Display Unit, Engine Indicating and Crew Alerting System, Electronic Centralized Aircraft Monitor, Multi-Function Display, Side Displays, Electronic Flight Bags, Portable Electronic Devices (e.g., laptops, smartphones, tablets), and/or user-wearable devices such as wrist- and head-mounted devices). The display system may be configured to present one or more display(s) or image(s). In some embodiments, the terms "display" and "image" are interchangeable and treated synonymously.

Figure 3:
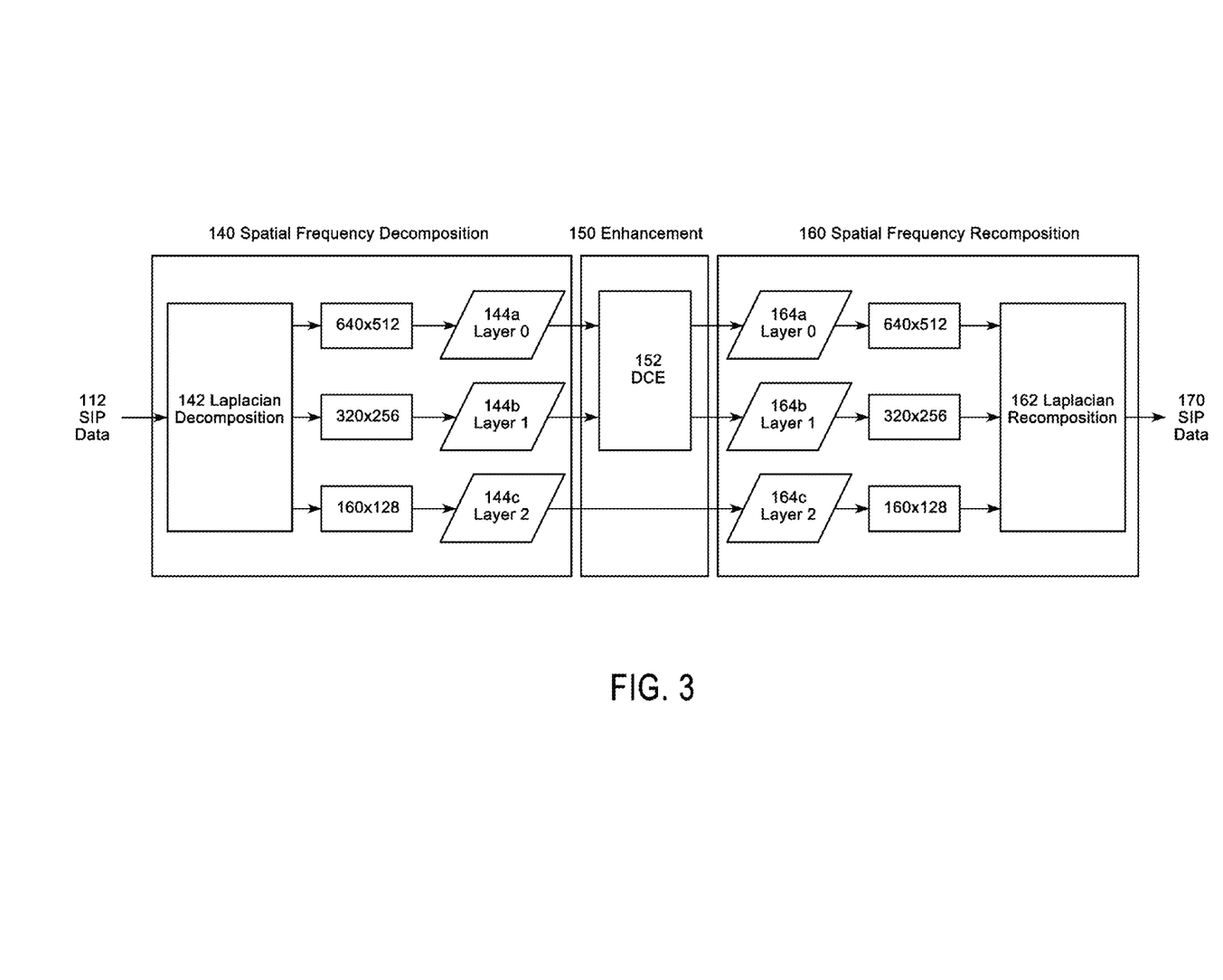
FIG. 3 depicts a functional block diagram of the ICE system that is performed by an image processor.

Referring now to FIG. 3, functional blocks of the ICE system 100 that may be performable by the IP 120 are illustrated. These functional blocks are comprised of a spatial frequency decomposition (SFD) block 140, an enhancement block 150, and a spatial frequency reconstruction (SFR) 160.

The SFD block 140 may be configured to receive spatial image pixel (SIP) data 112 originating from the image sensor(s) 110. The SFD block 140 could include a Laplacian decomposition block 142 configured with functionality to perform a Laplacian decomposition of the SIP data 112. In the configuration shown, SIP data 112 (assumed to be comprised of 640 by 512 spatial pixels) is received by the Laplacian decomposition block 122 and converted into 640 by 512 frequency pixels (layer 0 of a Laplacian Pyramid), 320 by 256 frequency pixels (layer 1 of the Laplacian pyramid), and 160 by 128 frequency pixels (layer 2 of the Laplacian pyramid). As a result of a Laplacian decomposition, the SIP data 112 has been converted into three layers of frequency image pixel (FIP) data: layer 0 (block 124a), layer 1 (block 124a), and layer 2 (block 124c).

The enhancement block 150 may be configured to receive data from SFD 140 block. The enhancement block 150 could include a dynamic content enhancement (DCE) block 152 configured with functionality to dynamically enhance one or more layers of the FIP data by the techniques described herein. In the configuration shown, FIP data from layer blocks 144a and 144b are provided to the DCE 152, respectively. Although the DCE 152 is shown as receiving two layers, the DCE 152 could be configured to more than two layers or only one layer.

The SFR block 160 may be configured to receive the FIP data that has been dynamically enhanced by the DCE block 152. The SFR block 160 could include a Laplacian reconstruction block 162 configured with the functionality to reconstruct layers 164a, 164b, and 164c of FIP data (two of which having been subjected to the DCE block 132) into SIP data 170 data representative of one dynamically enhanced image. In the configuration shown, the SFR block 160 reconstructs the Laplacian Pyramid layers 162a, 162b, and 162c into a single image. Because the image represented in the SIP data 112 was assumed to be comprised of 640 by 512 spatial pixels, the reconstructed image will be comprised of 640 by 512 spatial pixels. Once the SIP data 170 has been formed, it may be provided to one or more user systems such as, but not limited to, the display system 130 configured to present the dynamically enhanced image, either in part or in whole, to one or more viewers.

Figure 4A:
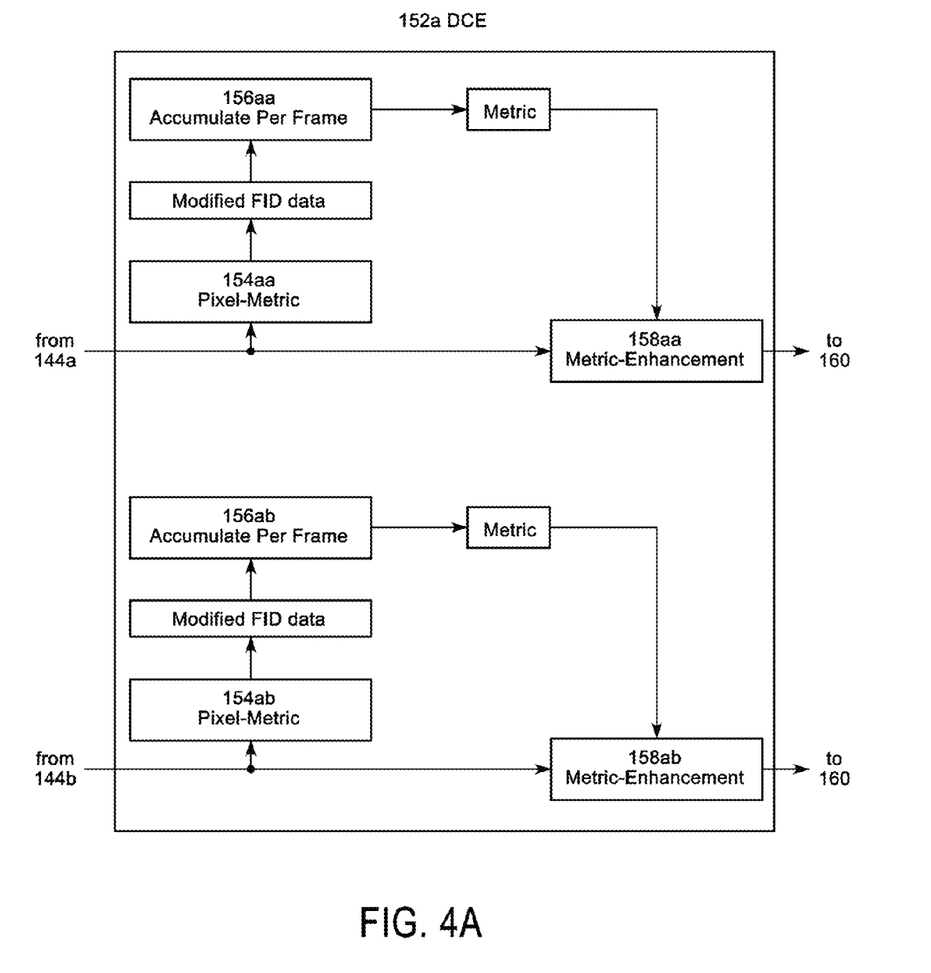
FIG. 4A depicts a functional block diagram of a first configuration of dynamic content enhancement (DCE).
Figure 4B:
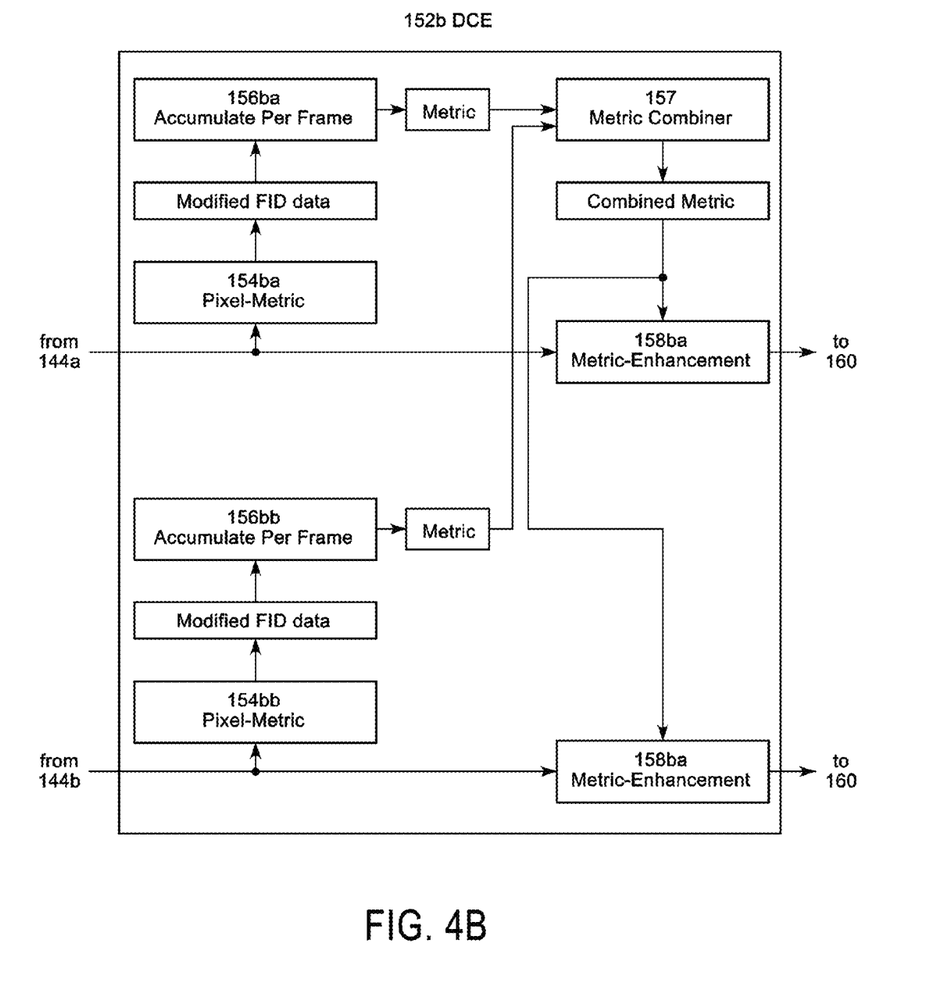
FIG. 4B depicts a functional block diagram of a second configuration of DCE.

Referring now to FIGS. 4A and 4B, two configurations of the DCE block 152 are illustrated. In FIG. 4A, DCE block 152a could include pixel-metric blocks 154aa and 154ab, frame accumulator blocks 156aa and 156ab, and metric-enhancement blocks 158aa and 158ab. The pixel-metric blocks 154aa and 154ab may be configured with functionality to modify the FIP data of block 144a and 144b, respectively, for the purpose of removing noise represented as unusable content and/or exaggerating features represented by usable content.

Figure 5A:
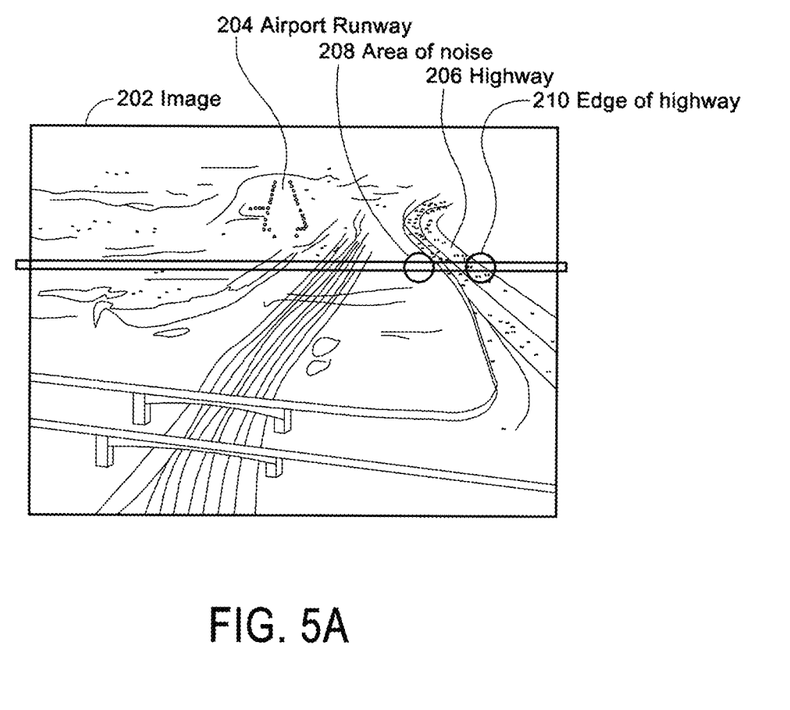
FIG. 5A depicts a hypothetical image represented in spatial pixel image data.

Referring to FIG. 5A, an example of a hypothetical image 202 represented in hypothetical SIP data is illustrated, where the hypothetical image 202 (the width of which is assumed to be 700 pixel columns) includes an airport runway 204 and a highway 206. As shown, an area of noise 208 and an edge of highway 210 have been identified.

Figure 5B:
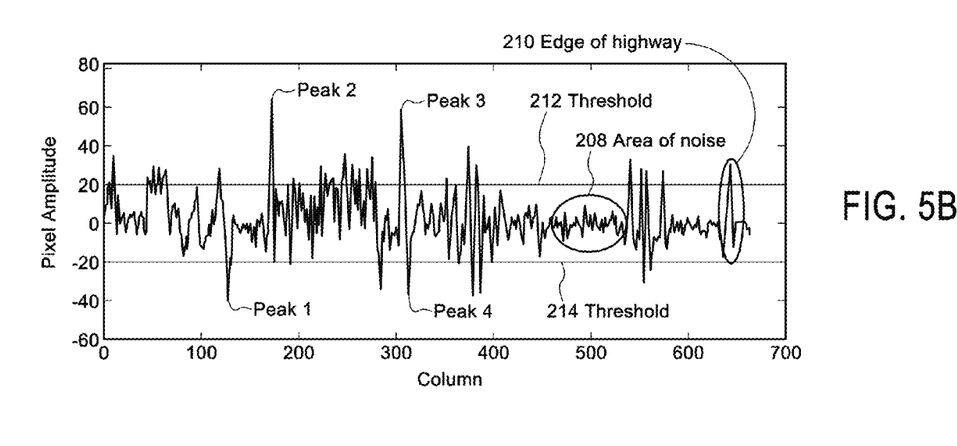
FIG. 5B depicts of frequency image pixel (FIP) data the hypothetical image of FIG. 5A.

Referring to FIG. 5B, FIP data of a hypothetical layer comprised of one row and resulting from a Laplacian decomposition of the hypothetical SIP data is shown in a graph of frequency pixel amplitudes in which the area of noise 208 and the edge of highway 210 are included. For the purpose of illustration and not of limitation, the functionality for modifying the FIP data could include frequency pixel amplitude thresholds 212 and 214. Noise or unusable content of the FIP data may be identified as the data falling in between thresholds 212 and 214 as illustrated by the area of noise 208, and feature or usable content of the FIP data may be identified as the data falling outside of thresholds 212 and 214 as illustrated by the edge of highway 210. In addition, four frequency pixel amplitude peaks have been identified for the purpose of illustration: peak 1, peak 2, peak 3, and peak 4. Once these identifications of unusable and usable content have been made, unusable FIP data could be modified by setting the frequency pixel amplitudes to zero, and usable FIP data could be modified by placing the absolute value of the usable FIP data into a range defined by minimum and maximum modified frequency pixel amplitudes.

Figure 5C:
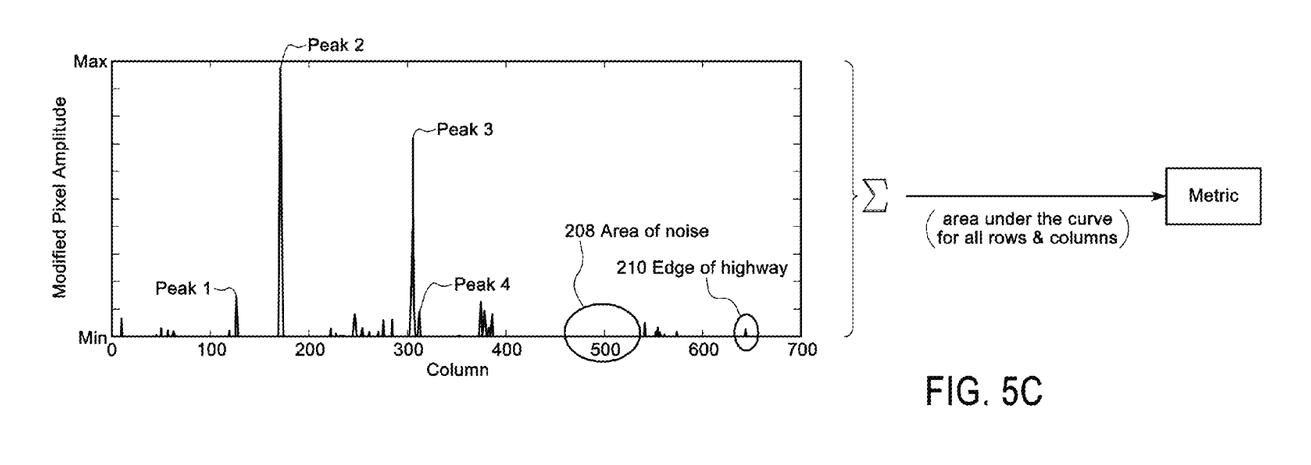
FIG. 5C depicts of modified FIP data of the FIP data of FIG. 5B.

Referring now to FIG. 5C, the results of the FIP data after modification are shown. As observed, the modified frequency pixel amplitudes of the unusable FIP data content are equal to zero as illustrated by the area of noise 208, leaving a graph of a curve comprised of modified frequency pixel amplitudes of usable FIP data of one row having values that are greater than zero as illustrated by the edge of highway 210, peak 1, peak 2, peak 3, and peak 4. Furthermore, when the amplitudes of peaks 2 and 3 of FIG. 5B are compared with peaks 2 and 3 of FIG. 5C, the difference in amplitudes between peaks 2 and 3 of FIG. 5C is more exaggerated than the difference in amplitudes between peaks 2 and 3 of FIG. 5B indicative of a non-linear, proportional relationship between the amplitudes of FIGS. 5B and 5C.

Returning now to FIG. 4A, the frame accumulator blocks 156aa and 156ab may be configured with functionality to accumulate the curves of the modified frequency pixels for each row of its respective layer and determine a metric of content enhancement from the accumulation. In some embodiments, the frame accumulator blocks 156aa and 156ab may determine respective metrics of content enhancement by finding an area under the accumulated row curves; that is, the finding of the area under the curves of modified frequency pixel amplitudes for all of the rows. A relatively small area could be indicated by setting the metric of content enhancement to a relatively small value correlating to a low level of usable content for the layer, and a relatively large area could be indicated by setting the metric to a relatively large value correlating to a high level of usable content.

The metric-enhancement blocks 158aa and 158ab may be configured with functionality to enhance the FIP data of layers 0 and 1, respectively, by applying its respective metric of content enhancement to its respective FIP data. Here, layers 0 and 1 of the Laplacian Pyramid may be enhanced commensurate to a level of content enhancement reflected by the metric. Once the enhancement is performed, the enhanced FIP data may be provided to 160 SFR block for a reconstruction of the layers.

Referring now to FIG. 4B, DCE block 152b could include pixel-metric blocks 154ba and 154bb, frame accumulator blocks 156ba and 156bb, a metric combiner 157, and metric-enhancement blocks 158ba and 158bb. The pixel-metric blocks 154ba and 154bb may be configured with the same or similar functionality to the pixel-metric blocks 154aa and 154ab, respectively; and the frame accumulator blocks 156ba and 156bb may be configured with the same or similar functionality to the frame accumulator blocks 156aa and 156ab.

The metric combiner 157 may be configured with functionality to determine a combined metric of content enhancement as a function of both metrics of content enhancement determined by the frame accumulator blocks 156ba and 156bb. In some embodiments, an average of both metrics could be used to determine the combined metric of content enhancement that is provided to the metric-enhancement blocks 158ba and 158bb in which the FIP data of layers 0 and 1 of the Laplacian Pyramid are enhanced with the combined metric.

Figure 6:
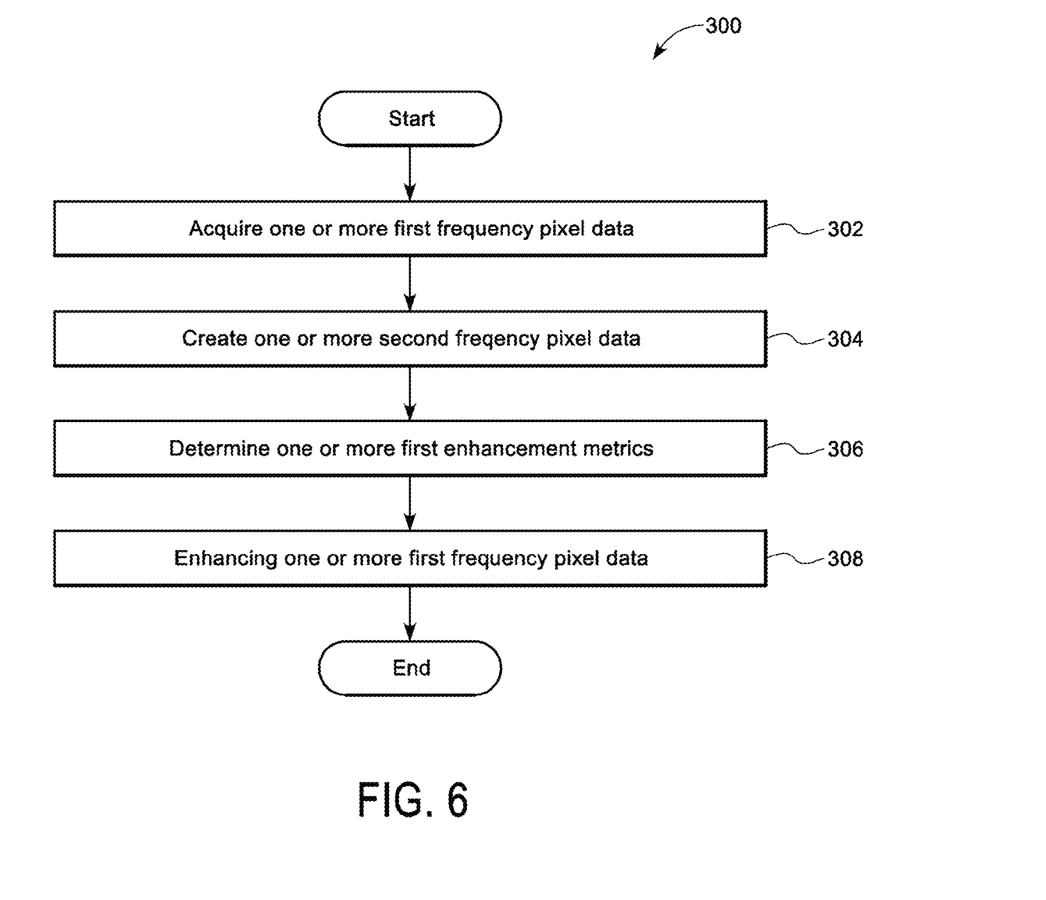
FIG. 6 illustrates a flowchart disclosing an embodiment of a method for generating and presenting enhanced image content.

FIG. 6 depicts flowchart 300 providing an example method for enhancing image content, where the IP 120 may be programmed or configured with instructions corresponding to the following modules that that may be continuously or periodically executed throughout the aircraft operation. The IP 120 may be a processing unit(s) of a module such as, but not limited to, a printed circuit card assembly having one or more input interfaces (e.g., virtual or physical computer ports) to facilitate data communications with the IP 120, i.e., the receiving and providing of data (e.g., one or more electrical or optical signals including data and/or being indicative of data). For the accomplishment of the following modules embodied in FIG. 6, the acquiring of data is synonymous and/or interchangeable with reading, receiving, and/or the retrieval of data.

The method of flowchart 300 begins with module 302 with the IP 120 acquiring one or more first FIP data representative of a plurality of first frequency pixel amplitudes and comprised of a plurality of rows and columns, where each first frequency pixel amplitude may be a measurement of one pixel. As discussed above, first FIP data could originate as SIP data 112 representative of an image of a scene and could be comprised of layers 0 and/or 1 of a Laplacian pyramid prior to being subjected to respective blocks 154aa and/or 154ab (or respective blocks 154ba and/or 154bb), each layer being comprised of a unique number of rows and columns. In some embodiments, the first frequency pixel data may be comprised of unusable content defined by a range of first frequency pixel amplitudes and usable content falling outside of the range.

The method of flowchart 300 continues with module 304 with the IP 120 creating one or more second FIP data (e.g., one or more modified first FIP data) as a function of the first FIP data, where the second FIP data could be representative of a plurality of second frequency pixel amplitudes and comprised of a plurality of rows and columns. Each second frequency pixel amplitude may be a measurement of one pixel corresponding to one pixel of the first FIP data; that is, one second frequency pixel amplitude of one layer may correspond to one first frequency pixel amplitude of the same layer. In some embodiments, the function could include separating the usable content from the unusable content. In some embodiments, the range of first frequency pixel amplitudes could be defined by an absolute value function, where the unusable content may include each one of the plurality of first frequency pixel amplitudes less than or equal to the absolute value of a frequency pixel amplitude threshold. In some embodiments, the function could include a reduction function which reduces or removes the unusable content by, for example, setting the second frequency pixel amplitudes of the unusable content to zero.

The method of flowchart 300 continues with module 306 with the IP 120 determining one or more first enhancement metrics as a function one or more second FIP data, respectively. In some embodiments, the function could include a statistical function applied to each second frequency pixel amplitude of one second FIP data from which one first enhancement metric may be determined for one layer.

In some embodiments, the statistical function could include an average function from which an average of the plurality of second frequency pixel amplitudes for one layer is determined as one first enhancement metric. A relatively low average could indicate a relatively low level of usable content that may be indicated by setting a relatively low value for the first enhancement metric; similarly, a relatively high average could indicate a relatively high level of usable content that may be indicated by setting a relatively high value for the first enhancement metric.

In some embodiments, the function could include finding a total area under a plurality of curves for the plurality of rows, where each curve could be comprised of a graph of second frequency pixel amplitudes plotted against all of the pixel columns of one row. A relatively small area could indicate a relatively low level of usable content that may be indicated by setting a relatively low value for the first enhancement metric; similarity, a relatively high average could indicate a relatively high level of usable content that may be indicated by setting a relatively high value for the first enhancement metric.

The method of flowchart 300 continues with module 308 with the IP 120 enhancing each first FIP data as a function of the first enhancement metric or a combination of first enhancement metrics. In some embodiments, each layer of the enhanced first FIP data may be reconstructed with the other layers formed by the SFD of the SIP data to form enhanced SIP data representative of an enhanced image of the scene.

In some embodiments, third FIP data may be created by the SFD of the SIP data and comprised of a layer (e.g., layer 2); if so, this layer could be included in the SFR performed by SFR block 160. Then, the method of flowchart 300 ends.

It should be noted that the steps of the method described above may be embodied in computer-readable media stored in a non-transitory computer-readable medium as computer instruction code. The method may include one or more of the steps described herein, which one or more steps may be carried out in any desired order including being carried out simultaneously with one another. For example, two or more of the steps disclosed herein may be combined in a single step and/or one or more of the steps may be carried out as two or more sub-steps. Further, steps not expressly disclosed or inherently present herein may be interspersed with or added to the steps described herein, or may be substituted for one or more of the steps described herein as will be appreciated by a person of ordinary skill in the art having the benefit of the instant disclosure.

As used herein, the term "embodiment" means an embodiment that serves to illustrate by way of example but not limitation.

It will be appreciated to those skilled in the art that the preceding examples and embodiments are exemplary and not limiting to the scope of the inventive concepts disclosed herein. It is intended that all modifications, permutations, enhancements, equivalents, and improvements thereto that are apparent to those skilled in the art upon a reading of the specification and a study of the drawings are included within the true spirit and scope of the inventive concepts disclosed herein. It is therefore intended that the following appended claims include all such modifications, permutations, enhancements, equivalents, and improvements falling within the true spirit and scope of the inventive concepts disclosed herein.

What is claimed is:

1. A system for presenting enhanced image content, comprising:
an image processor including at least one processor coupled to a non-transitory processor-readable medium storing processor-executable code and configured to:
acquire at least one first frequency image pixel data
created from spatial image pixel data representative of a first image, and
comprised of a plurality of first frequency pixel amplitudes being comprised of noise content and feature content, where
the noise content includes each one of the first frequency pixel amplitudes greater than or equal to a minimum threshold and less than or equal to a maximum threshold, and
the feature content includes each one of the first frequency pixel amplitudes less than or equal to the minimum threshold or greater than or equal to the maximum threshold;
modify the at least one first frequency image pixel data to create at least one second frequency image pixel data, where
each one of the second frequency image pixel data is comprised of a plurality of second frequency pixel amplitudes corresponding to the plurality of first frequency pixel amplitudes, where
each one of the first frequency pixel amplitudes of the noise content is modified to create one second frequency pixel amplitude having an amplitude of zero, and
each one of the first frequency pixel amplitudes of the feature content is modified to create one second frequency pixel amplitude having a positive, non-zero amplitude;
determine one first enhancement metric for each one of the second frequency image pixel data as a function of at least one of an averaging function and a summation function, where
the averaging function is applied to the plurality of second frequency pixel amplitudes, and
the summation function is applied to a plurality of curves, where
each one of the second frequency image pixel data is representative of the plurality of curves comprised of the plurality of second frequency pixel amplitudes;

enhance each one of the at least one first frequency image pixel data as a function of the first enhancement metric or a second enhancement metric determined from a plurality of first enhancement metrics;
create spatial image pixel data representative of a second image as a function of each one of the enhanced first frequency image pixel data; and
provide the second spatial image pixel data to at least one display unit; and
the at least one display unit configured to:
receive the spatial image pixel data representative of the second image, and
present the second image to a viewer.

2. The system of claim 1, wherein the creation of the at least one first frequency image pixel data is performed by an image transformation function being applied to the spatial image pixel data representative of the first image.

3. The system of claim 2, wherein
the image transformation function is a Laplacian image transformation function, where each one of the first frequency image pixel data is representative of one layer of a Laplacian pyramid.

4. The system of claim 1, wherein
the image processor is further configured to:
acquire third frequency image pixel data created from the spatial image pixel data representative of the first image, such that
the function for creating the spatial image pixel data representative of the second image includes the third frequency image pixel data.

5. A device for enhancing image content, comprising:
an image processor including at least one processor coupled to a non-transitory processor-readable medium storing processor-executable code and configured to:
acquire at least one first frequency image pixel data comprised of a plurality of first frequency pixel amplitudes being comprised of noise content and feature content, where
the noise content includes each one of the first frequency pixel amplitudes greater than or equal to a minimum threshold and less than or equal to a maximum threshold, and
the feature content includes each one of the first frequency pixel amplitudes less than or equal to the minimum threshold or greater than or equal to the maximum threshold;
modify the at least one first frequency image pixel data to create at least one second frequency image pixel data, where
each one of the second frequency image pixel data is comprised of a plurality of second frequency pixel amplitudes corresponding to the plurality of first frequency pixel amplitudes, where
each one of the first frequency pixel amplitudes of the noise content is modified to create one second frequency pixel amplitude having an amplitude of zero, and
each one of the first frequency pixel amplitudes of the feature content is modified to create one second frequency pixel amplitude having a positive, non-zero amplitude;
determine one first enhancement metric for each one of the second frequency image pixel data as a function of at least one of an averaging function and a summation function, where
the averaging function is applied to the plurality of second frequency pixel amplitudes, and
the summation function is applied to a plurality of curves, where
each one of the second frequency image pixel data is representative of the plurality of curves comprised of the plurality of second frequency pixel amplitudes; and
enhance each one of the at least one first frequency image pixel data as a function of the first enhancement metric or a second enhancement metric determined from a plurality of first enhancement metrics, wherefrom
spatial image pixel data representative of an image is creatable as a function of each one of the enhanced first frequency image pixel data.

6. The device of claim 5, wherein
the image represented in the spatial image pixel data is a first image, and
the at least one first frequency image pixel data being acquired by the image processor is created from spatial image pixel data representative of a second image.

7. The device of claim 6, wherein the creation of the at least one first frequency image pixel data is performed by an image transformation function being applied to the spatial image pixel data representative of the second image.

8. The device of claim 5, wherein
the image represented in the spatial image pixel data is a first image, and
the image processor is further configured to:
acquire third frequency image pixel data created from spatial image pixel data representative of a second image, such that
the function for creating the spatial image pixel data representative of the first image includes the third frequency image pixel data.

9. The device of claim 5, wherein
the image processor is further configured to:
create the spatial image pixel data as a function of each one of the enhanced first frequency image pixel data, such that
the image is presentable to a viewer when provided to at least one display unit.

10. A method for enhancing image content, comprising:
acquiring, by an image processor including at least one processor coupled to a non-transitory processor-readable medium storing processor-executable code, at least one first frequency image pixel data comprised of a plurality of first frequency pixel amplitudes being comprised of noise content and feature content, where
the noise content includes each one of the first frequency pixel amplitudes greater than or equal to a minimum threshold and less than or equal to a maximum threshold, and
the feature content includes each one of the first frequency pixel amplitudes less than or equal to the minimum threshold or greater than or equal to the maximum threshold;
modifying the at least one first frequency image pixel data to create at least one second frequency image pixel data, where
each one of the second frequency image pixel data is comprised of a plurality of second frequency pixel amplitudes corresponding to the plurality of first frequency pixel amplitudes, where
each one of the first frequency pixel amplitudes of the noise content is modified to create one second frequency pixel amplitude having an amplitude of zero, and each one of the first frequency pixel amplitudes of the feature content is modified to create one second frequency pixel amplitude having a positive, non-zero amplitude;

determining one first enhancement metric for each one of the second frequency image pixel data as a function of at least one of an averaging function and a summation function, where
- the averaging function is applied to the plurality of second frequency pixel amplitudes, and
- the summation function is applied to a plurality of curves, where
  - each one of the second frequency image pixel data is representative of the plurality of curves comprised of the plurality of second frequency pixel amplitudes; and enhancing each one of the at least one first frequency image pixel data as a function of the first enhancement metric or a second enhancement metric determined from a plurality of first enhancement metrics, wherefrom
- spatial image pixel data representative of an image is creatable as a function of each one of the enhanced first frequency image pixel data.

11. The method of claim 10, wherein
- the image represented in the spatial image pixel data is a first image, and
- the at least one first frequency image pixel data being acquired by the image processor is created from spatial image pixel data representative of a second image.

12. The method of claim 11, wherein the creation of the at least one first frequency image pixel data is performed by an image transformation function being applied to the spatial image pixel data representative of the second image.

13. The method of claim 10, wherein the image represented in the spatial image pixel data is a first image, and further comprising:
- acquiring third frequency image pixel data created from spatial image pixel data representative of a second image, such that
  - the function for creating the spatial image pixel data representative of the first image includes the third frequency image pixel data.

14. The method of claim 10, further comprising:
- creating the spatial image pixel data as a function of each one of the enhanced first frequency image pixel data, such that
  - the image is presentable to a viewer when provided to at least one display unit.

\* \* \* \* \*